(12) United States Patent
Khalid et al.

(10) Patent No.: US 12,526,352 B2
(45) Date of Patent: Jan. 13, 2026

(54) GRANULAR AND EFFICIENT POLICY-BASED ROUTING IN SOFTWARE-DEFINED EDGE NETWORKS

(71) Applicant: Dell Products L.P., Round Rock, TX (US)

(72) Inventors: Ahmed Khalid, Carrigtwohill (IE); Seán Ahearne, Ballinglanna (IE)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 18/176,207

(22) Filed: Feb. 28, 2023

(65) Prior Publication Data
US 2024/0291910 A1    Aug. 29, 2024

(51) Int. Cl.
*H04L 69/22* (2022.01)
*H04L 45/74* (2022.01)
*H04L 47/20* (2022.01)

(52) U.S. Cl.
CPC .............. *H04L 69/22* (2013.01); *H04L 45/74* (2013.01); *H04L 47/20* (2013.01)

(58) Field of Classification Search
CPC ......... H04L 69/22; H04L 45/74; H04L 47/20; H04L 45/38; H04L 45/64; H04L 49/70
See application file for complete search history.

(56) References Cited

U.S. PATENT DOCUMENTS

| | | | |
|---|---|---|---|
| 2008/0137686 A1* | 6/2008 | Agarwal | H04L 45/7453 370/474 |
| 2010/0188976 A1* | 7/2010 | Rahman | H04L 41/0894 370/235 |
| 2016/0205015 A1* | 7/2016 | Halligan | H04L 45/56 370/400 |
| 2018/0307522 A1* | 10/2018 | Wu | H04L 43/0811 |
| 2019/0166020 A1* | 5/2019 | Mommileti | H04L 43/12 |
| 2019/0222538 A1* | 7/2019 | Yang | H04L 49/15 |

* cited by examiner

*Primary Examiner* — Sun Jong Kim
(74) *Attorney, Agent, or Firm* — Workman Nydegger

(57) ABSTRACT

Policy based routing in networks including software-based networks is disclosed. Packets ingested into a software defined network are altered to include a label header that identifies a source and destination of a packet. If the packets leave or egress the network, the packets are converted back to regular packets by removing the label header. Adding the label header reduces overhead. Further routing can be performed while enforcing policies.

20 Claims, 8 Drawing Sheets

GRANULAR AND EFFICIENT POLICY-BASED ROUTING IN SOFTWARE-DEFINED EDGE NETWORKS

FIELD OF THE INVENTION

Embodiments of the present invention generally relate to routing traffic in computing networks. More particularly, at least some embodiments of the invention relate to systems, hardware, software, computer-readable media, and methods for policy-based routing in software defined networks.

BACKGROUND

Routing in edge networks is complicated by the fact that edge networks often include low-powered devices with comparatively scarce resources at least because routing operations have high overhead. More specifically, many deployments of large-scale networks at the edge or in the cloud operate on standard TCP/IP routing protocols. While this routing model is compatible with legacy devices, this model produces substantial overhead, particularly for small packets which account for roughly 30% of all network traffic in some systems.

In a standard DNS query for example, a 76-byte packet consists of 16 bytes of payload data (the DNS query) and 60 bytes of standard TCP/IP/Ethernet header information. This means that 79% of the data travelling across network to fulfill this request is overhead that requires processing, often at each hop in the path. This overhead ratio can be even greater, as many applications frequently communicate using packet sizes of 64-70 bytes.

Further, the overhead associated with these packets increases in modern cloud and edge computing environments where containerized applications require end-to-end connectivity, which is generally provided through overlay networks and encapsulations.

Kubernetes, an example of a container orchestrator system, deploys an internal networking subsystem in order to enable seamless communications of applications in a cluster. This network subsystem is overlaid on top of the physical network infrastructure and relies on VXLAN (Virtual Extensible LAN) in many implementations in order to correctly route traffic between nodes.

VXLAN is an encapsulation protocol that encapsulates the payload traffic that is being communicated between nodes. This encapsulation requires an extra layer of TCP/IP headers in order to function (adding an extra 54 bytes). Consequently, an 8-byte communication between nodes requires 108-120 bytes of header data, an overhead ratio of over 93%.

This level of overhead, aside from being inefficient, can also cause congestion in edge networks, particularly where resources (e.g., 4G/5G/Wi-Fi) are scarce. The reason for the congestion is that an FCS (Frame Check Sequence) is always performed for each network packet transmitted and received. In addition to processing larger packets, a packet that contains errors (fails the FCS checksum) is discarded. Further, the likelihood of a network packet containing an error is directly proportional to the BER (Bit Error Rate) of the communications link. This means that larger packets are more likely to experience an error. This is concerning in wireless links, where BER levels can vary over time due to various different environmental factors.

The design of traditional TCP/IP packets also impacts the header overhead in relation to the packet processing rate of programmable switches (e.g., P4—Programming Protocol-Independent Packet Processor switches). For example, all packet headers are processed by the switch in sequence up to a desired match-action rule programmed by the user. For example, routing traffic based on a VXLAN ID requires parsing the preceding Ethernet, IP, and TCP headers before reaching the VXLAN header where the action is programmed to take place.

In a containerized edge environment where telemetry and network policies are defined at a granular microservice level, the overhead and computation cost can increase rapidly. The processing cost for incoming packets increases with the number of headers to parse. For example, if a network policy applies to UDP (User Datagram Protocol) traffic on a certain port, network, and transport layer headers will need to be parsed for each incoming packet. This results in high computational cost.

Furthermore, in a containerized environment, traffic belonging to a certain flow is generally identified using encapsulation techniques, such as VXLAN. This results in additional overhead in terms of packet and header sizes. In computing environments with scarce network resources, such overheads are undesirable.

Consequently, due to the complex and dynamic nature of containerized environments, network administration becomes challenging.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
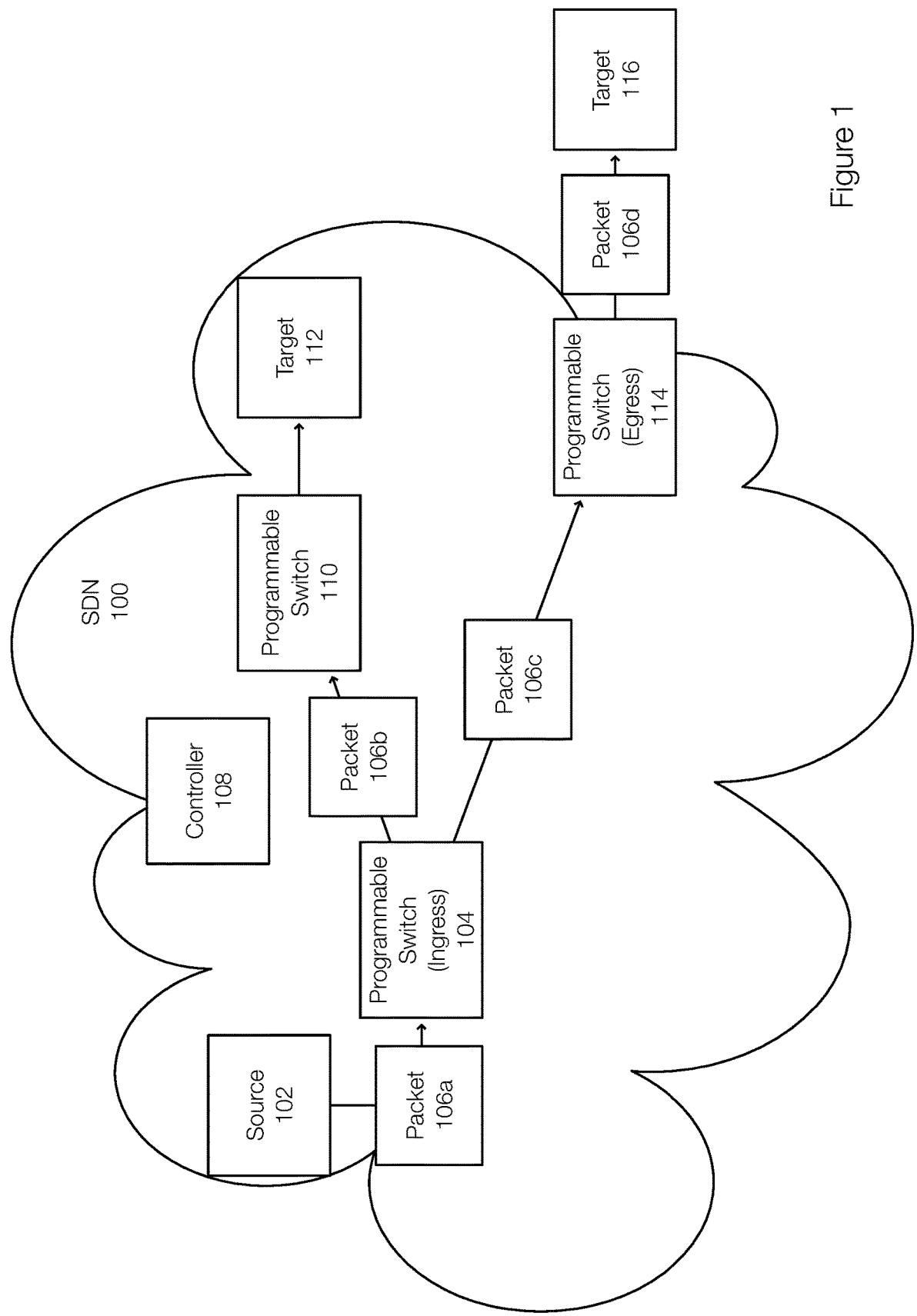
FIG. 1 discloses aspects of routing packets in computing environments including a software defined network (SDN)

Embodiments of the present invention generally relate to packet routing in computing networks. More particularly, at least some embodiments of the invention relate to systems, hardware, software, computer-readable media, and methods for policy-based routing in software defined networks (SDN). SDNs that include programmable switches may incorporate complex user-defined policies directly into the forwarding rules and achieve better overall performance, better management, higher Qos, lower resource consumption, and ease of deployment.

By way of example, software defined networks or software defined networking may use logical controllers (e.g., software) or application programming interfaces (APIs) to communicate with switches including programmable switches. This allows the logical controllers to direct and configure packet traffic in a network such as an SDN.

As previously stated, traditional routing includes compute intensive operations that have substantial overhead. These operations and the associated overhead are reduced or unnecessary in embodiments of the invention. Edge networks, which may include telemetry systems, may require a granular approach with separate entries for each application or process (e.g., a pod or a container) based on custom labels and annotations. Traditional approaches are generally unable to provide such a granular view and additionally require computing resources to translate network tuples to pod labels/names.

Embodiments of the invention relate to a custom header to tag packets with unique identifiers, which may be based on traditional addresses or labeling schemes. These unique identifiers reduce the size of the header and may be used for routing packets in an SDN, a distributed SDN, and the like. Embodiments of the invention save compute resources, reduce overhead, improve telemetry and QoS (Quality of Service) implementations, and also improve the experience of developers. Packets are converted from/to standard form at ingress/egress points, making the process transparent to and compatible with other networks, network devices and hosts.

An SDN may be associated with nodes that are distributed across multiple clusters and packets transmitted from one pod to another pod or to an external network may traverse programmable switches. Multiple pods (e.g., applications, containers, or microservices) may be placed on the nodes. The SDN may be managed by a logically centralized SDN controller.

For an end-to-end solution, an SDN and its associated features can be extended inside a node using a smart NIC or a virtual programmable switch. Pods can then connect directly to this switch, allowing each communication to/from that pod to be managed and tracked by the corresponding policies.

In another example, embodiments of the invention may operate and incorporate traditional devices/components such as bridges. In this case, the telemetry and policies for pods communicating within a node many not directly be handled by the SDN controller. Embodiments of the invention, in these situations, may start at a first programmable hop in the SDN (e.g., the first programmable switch in the packet path).

The SDN controller configures the virtual and physical programmable switches in the SDN based on network policies defined by the administrators and platform users. An administrator can define policies based on IP ranges, source and/or destination IP addresses, source and/or destination pod name, custom labels or the like.

In one example, a database is provided that may maintain a list of pods and their metadata. A container orchestration system, such as Kubernetes, may use a flat IP allocation scheme where each pod receives a unique IP address. The database may use IP and MAC addresses as identifiers and record labels and policies corresponding to those addresses. Thus, the IP and MAC addresses are associated with labels and policies.

Embodiments of the invention may assign a unique identifier (UID) to each label, IP address, or MAC address. A UID can be assigned to a pod at the time of deployment, based on an ID provided by an orchestrator (e.g., Kubernetes). This may allow the pod to change its IP or the host the pod is running on while keeping the same UID. The SDN switches would be updated when a change in the pod configuration occurs. In embodiments of the invention, the UID may be used to recognize/route traffic from the pods within the SDN. The label may also be based on protocol type, IP ranges or port numbers. In addition, identifiers for traversing the external network are also stored. This also allows the SDN to return the packet to its default TCP/IP header configuration when egressing to an external network to maintain transparent compatibility or remain compatible with other network infrastructure.

Embodiments of the invention provide a mechanism that allows communication in computing networks while reducing overhead. Embodiments of the invention consider different types of communications that include least: (i) pods on the same node (intranode); (ii) pods on different nodes (intracluster); (iii) pods on different clusters (external); and (iv) pods with external networks (external). The fourth type, in one embodiment, is a subset of the third type of communication.

Embodiments of the invention further relate to routing packets in these communications in a manner that considers whether the path/route includes an ingress switch, an egress switch, ingress and egress switches, or neither ingress nor egress switches.

Embodiments of the invention reduce overhead by reducing the packet processing requirements and facilitating packet transmission. Depending on the communication type, a packet may be configured to include a label header to facilitate communication within the SDN. Adding a label header, which includes the identifiers of the source and of the target, can reduce parsing/processing requirements and forwarding operations can be performed more efficiently. Devices with limited computing resources can reduce or avoid congestion problems due to the reduced overhead.

FIG. 1 discloses aspects of routing packets in computing networks. FIG. 1 illustrates an SDN 100. A source 102 is an example of a pod (e.g., application, container) that may be operating on a node of a cluster associated with the SDN 100. The source 102 may generate a packet 106a for transmission to a target (e.g., a target pod). As the packet is routed, the packet is referenced as packet 106a, packet 106b, 106c, or 106d in FIG. 1 depending on its location in the path or actions that have been performed on the packet 106a. The packets 106a and 106b illustrate a path whose communication type is intracluster. The packets 106a, 106b, and 106c illustrate a path whose communication type is external.

In this example, programmable switches 104, 110, and 114 of the SDN 100 are controlled by a logical controller 108. The source 102 and the target 112 are part of the SDN 100 but may be in different clusters. The target 116 is outside or external to the SDN 100.

When the source 102 generates the packet 106a, the packet 106a may be generated in accordance with conventional TCP/IP protocols. When the packet 106a reaches the programmable switch 104, the packet 106a may be transformed or converted into a packet 106b when the target is the target 112, which is inside the SDN 100. More specifically, the packet 106a is transformed into the packet 106b. When the target 112 is inside the SDN 100, no further conversion of the packet 106b is required.

The packet 106a may be converted into the packet 106c when the target is the target 116. However, because the next hop in the path to the target 116 is the switch 114, which is inside the SDN 100, the packet 106b and the packet 106c have the same or similar structure. More specifically, packets may have one structure when being transmitted inside the SDN 100. Packets that ingress into the SDN 100 or egress out of the SDN 100 may be converted.

In this example, the switch 104 is an ingress switch because the packet is being transformed or converted into a simpler structure that is associated with less overhead. The conversion may include adding a label header and an ethernet type to the packet 106a to generate the packet 106b or the packet 106c. The label header may identify the source and the target by including the respective unique identifiers in the label header. Aspects of traditional TCP/IP packets can be removed, stored by the controller, left in the packet, or the like. The TCP/IP aspects not required for transmission inside the SDN 100 may be retained in some manner and restored when necessary.

The packet 106b, during routing, avoids overhead associated with conventional TCP/IP packets as the label header is used for forwarding purposes. More specifically, the ethernet type may indicate that that the packet can be routed using the label header, which may include an identifier (e.g., UID) of the source 102 and of the target 112. This substantially reduces overhead, particularly when the path includes multiple switches.

For example, if the target of the packet 106a is the target 112, the ingress switch 106 converts the packet 106a into a packet 106b which includes the label header. The packet 106b is received by the programmable switch 110 and delivered to the target 112, which is part of the SDN 100. In this example, an egress switch is not needed or traversed at least because the target 112 is part of the SDN 100.

In another example, the target of the packet 106a is the target 116, which is outside of or external to the SDN 100. In this example, the ingress switch 104 converts the packet 106a to the packet 106c as previously described. When the packet arrives at the switch 114, which is an egress switch in this example, the packet 106c is converted or transformed into the packet 106d (which includes the packet information included in the packet 106a). More specifically, the label header may be removed and the conventional TCP/IP information may be returned to the packet 106d such that the packet 106d can be transmitted to the target 116 and such that the packet 106d is compatible with the external network. The controller 108 may perform packet conversion or packet configuration at ingress and egress switches. Stated differently, the switches may be configured to recognize and convert relevant packets.

More generally, packets may be solely routed within an SDN. Packets may also enter/leave and SDN. FIG. 1 illustrates two flow examples. However, other packets may flow in the reverse direction. Regardless of the direction of traffic flow in this example, the packets 102a and 102d follow a standard TCP/IP header structure. The packets 106b and 106c follow or include a UID header structure.

Figure 2:
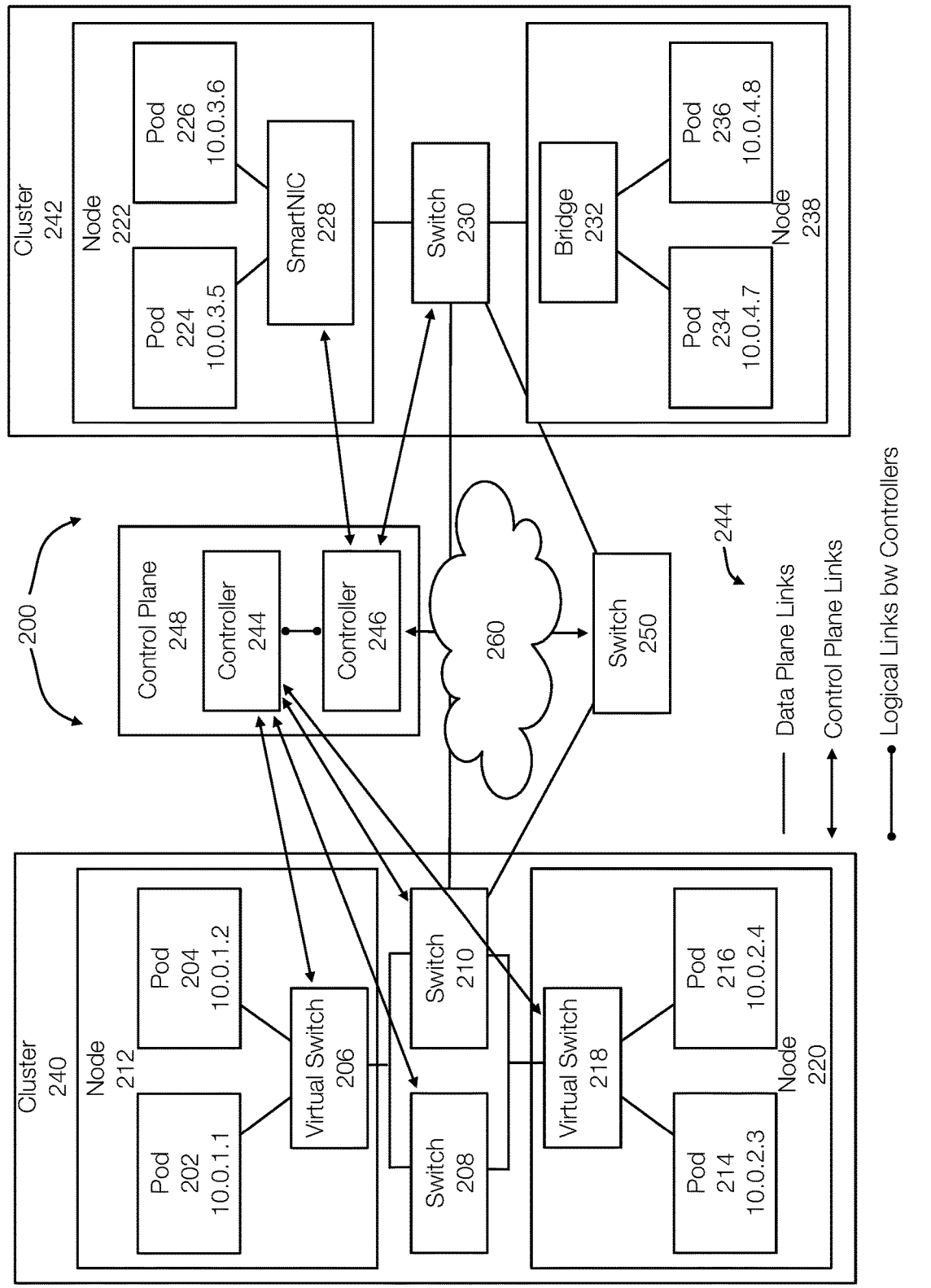
FIG. 2 discloses aspects of a computing environment that includes an SDN and illustrates a data plane and a control plane.

FIG. 2 discloses aspects of a computing environment configured to implement packet routing, including policy-based routing, in networks such as SDNs. The environment 200 may be, by way of example, or include a containerized environment. The environment 200 includes clusters represented by a cluster 240 and a cluster 242. The cluster 240 includes nodes 212 and 220 and the cluster 242 includes nodes 222 and 238.

The node 212 includes pods 202 and 204 and a virtual switch 206. The node 220 includes pods 214 and 216 and a virtual switch 218. The node 222 includes pods 224 and 226 and a SmartNIC (smart Network Interface Card) 228, which may operate as a switch. The node 238 includes pods 234 and 236 and a bridge 232. The environment may also include other switches, such as switches 208, 210, 230, and 250.

The data plane links, control plane links, and logical links between controllers are shown using different line types as defined in the legend 244. A control plane 248 is associated with controllers 244 and 246, which may each be associated with different switches as illustrated in FIG. 2. The controllers 244 and 246 are examples of SDN controllers.

Thus, the environment 200 includes multiple nodes 212, 220, 222, and 238 that are distributed across multiple clusters. The switches 206, 208, 210, 218, 228, 230, and 250 are, in this example, programmable switches.

The pods shown in FIG. 2 are representative of multiple applications, microservices, containers or the like. In this example, a pod may include at least one container. Thus, a container runs in or is encapsulated in a pod. The nodes are the machines (physical or virtual) that host the pods. A cluster can include multiple nodes and each node may support multiple pods. The pods may or may not be related.

In FIG. 2, a network 260 is illustrated that is external to the SDN 200. When packets are sent from a source to a target over a path determined by the control plane 248, the first programmable switch in the path typically becomes the ingress switch in some communication types. The switch in the routing path before a packet is transmitted over or to an external network may be an egress switch. When the path of a packet exits the SDN 200 to the network 260 and then reenters the SDN 200, more than one of the switches may be ingress switches. The roles (ingress/egress) of the switches may change for packets routed in the other direction. Further, paths may or may not include ingress and/or egress switches.

Figure 3:
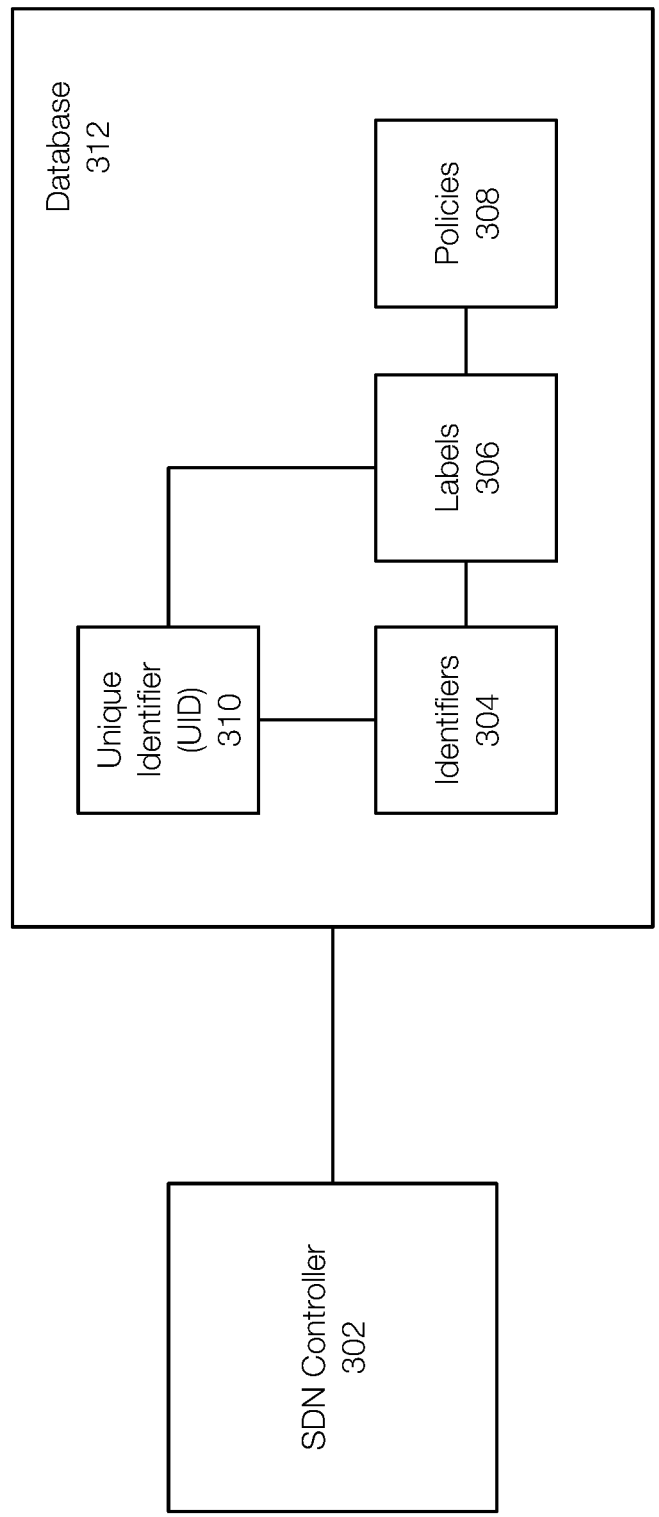
FIG. 3 discloses aspects of a database configured to store routing-related data.

FIG. 3 discloses aspects of a database configured to store information related to routing packets in a network such as an SDN. The controller 302 (or the control plane in general) may include or have access to a database 312. The database 312 may store information associated with pods in a computing environment.

More specifically, in an orchestration environment, such as Kubernetes, each pod receives a unique IP address (as illustrated in FIG. 2) and each pod may have a MAC address. These are examples of identifiers 304 that may be stored in the database. The identifiers may be associated with labels 306 and policies 308. This allows, for example, policies to be set and enforced for pods, applications, or the like in a computing environment such as an SDN.

Thus, the IP and MAC addresses may be used as identifiers 304. Labels 306 and policies 308 corresponding to those identifiers 304 can be stored in the database 312. Embodiments of the invention may further store unique identifiers (UID) 310, which can be assigned, by way of example, based on labels 306 or identifiers 304. The labels 306 may also be based on protocol type, IP ranges, port numbers and/or a container identifier This allows packets to be transmitted in the context of specific identifiers or labels, which may pertain to one or more pods.

The UIDs 310 may be used to recognize the traffic of a pod within a managed network such as an SDN. In addition, identifiers for traversing an external network may also be stored. These identifiers may include VXLAN tags or UDP ports.

Figure 4:
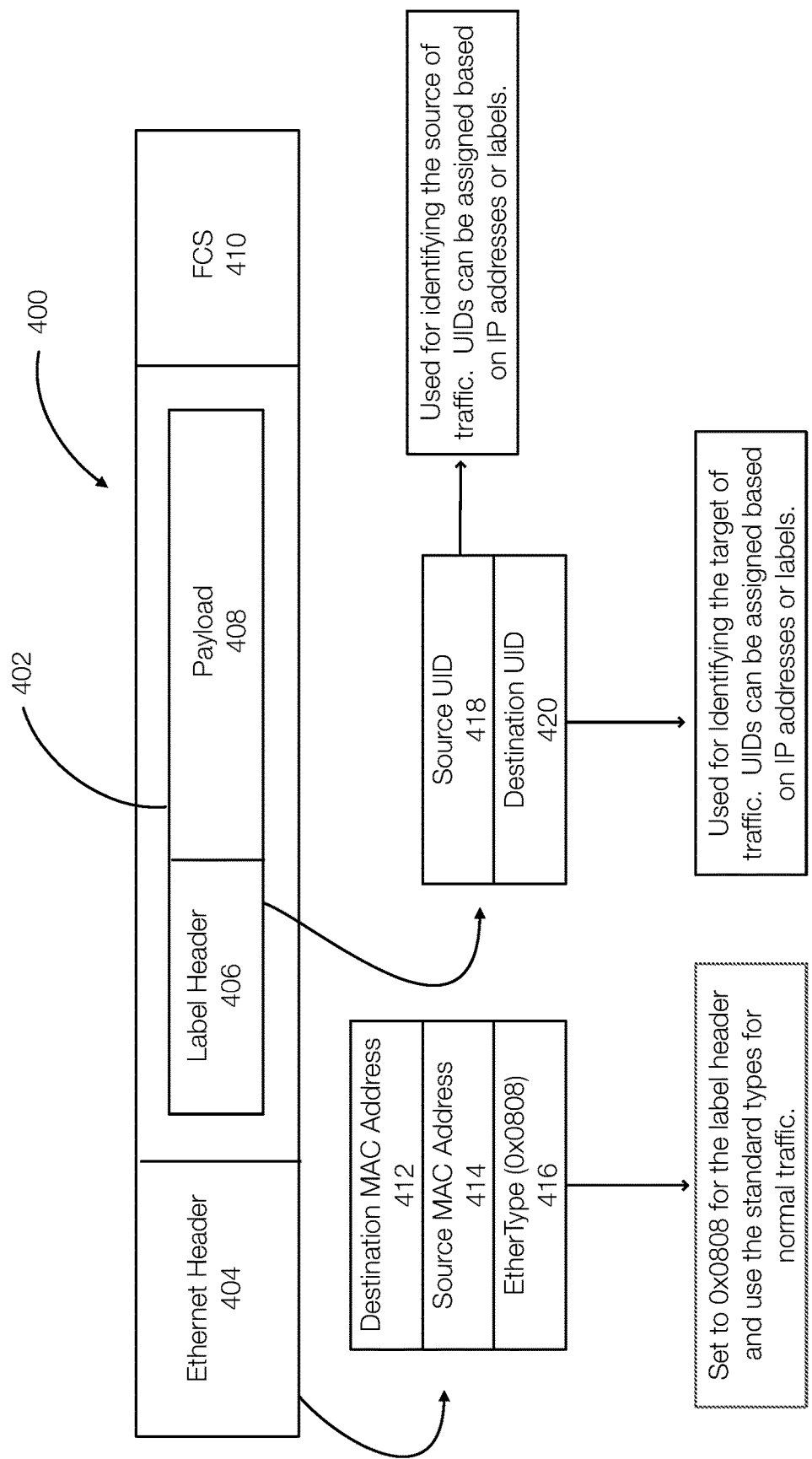
FIG. 4 discloses aspects of a packet in accordance with embodiments of the invention.

FIG. 4 discloses aspects of a packet that includes a label header. A controller may configure a network while accounting for a structure of a packet such as the packet 400. The packet 400 includes an ethernet header 404, an payload 408 (or portion thereof), and FCS (Frame Check Sequence) 410 by way of example. The label header 406 added, for example, at an ingress switch, may be placed between the payload 408 and the ethernet header 404.

The label header 406 includes two fields in one example: a source UID 418 and a destination UID 420. The source UID 418 is used to identify the source (e.g., the source pod) of the packet or traffic. The destination UID 420 may be used to identify the target (e.g., the target pod) of the packet or traffic.

As previously stated, the controller may assign a UID to each entry in its database (e.g., each pod or communication or identifier such as IP address or MAC address). The size of the UID can be configured based on the size and requirements of a network. A 3 byte UID can represent 16.7 million pods (281.4 trillion communication channels/combinations and should be sufficient for many networks. As a result, the size of the label header 406 may be 6 bytes. In comparison, VXLAN adds an encapsulation overhead of 54 bytes.

Embodiments of the invention may also set an ethernet type 416 to a predetermined value (e.g., 0x0808 or other unused value) to indicate that the traffic is labeled as optimized UID traffic and includes a label header. The ethernet type 416 allows labelled traffic to be identified quickly and efficiently at programmable switches because only the ethernet header 404 (the first layer to parse) needs to be parsed. Discovering the ethernet type 416 allows the switch to identify the label header 406 and further parsing may be unnecessary and the source and target identifiers can be used for routing purposes. In contrast, other encapsulation techniques require additional processing because the identifying parameters are buried in deeper layers and, consequently, require additional processing and higher overhead. Determining, from the ethernet header 404, that the packet 400 is labeled allows the packet 400 to be processed with much less overhead.

Figure 5:
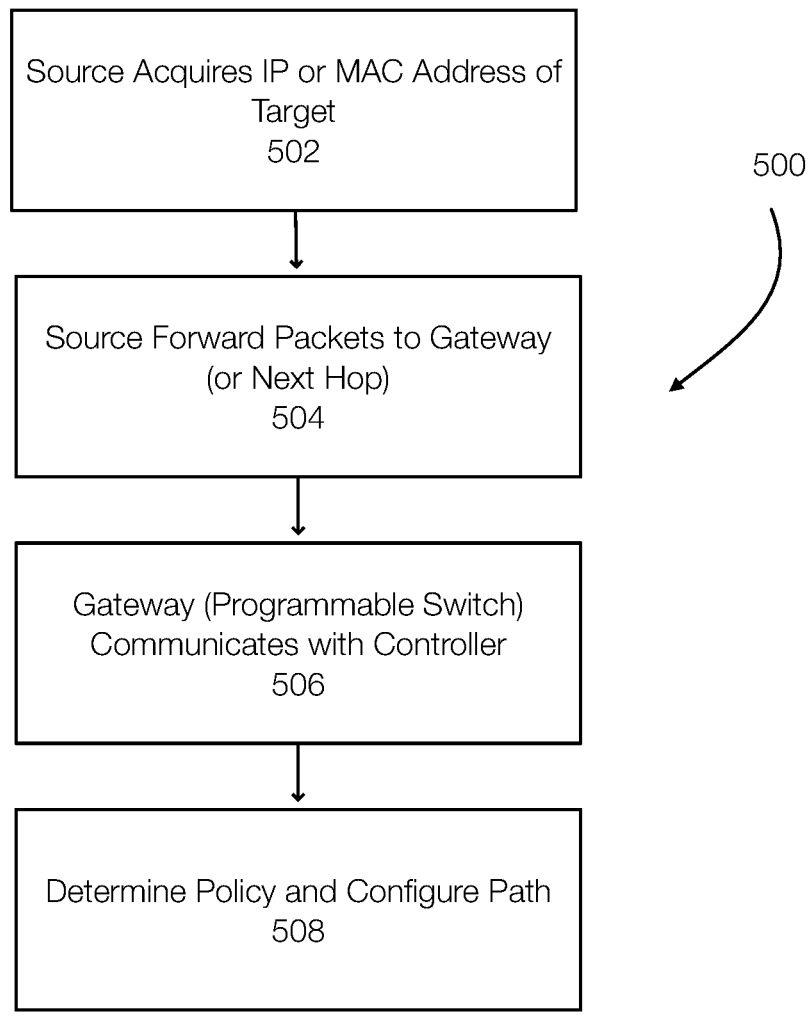
FIG. 5 discloses aspects of configuring a network for routing operations.

FIG. 5 discloses aspects of setting up aspects of an SDN and aspects of performing routing operations. The method 500 generally relates to setting up or configuring the network for communication. This may occur, for example, when a source is preparing to transmit data.

Initially, a source may want to communicate with a target. Thus, the source acquires 502 the IP address or MAC address of the target. This may be achieved by querying a DNS service. If the target is inside the SDN, the source may determine the MAC address using, for example, address resolution protocol (ARP). Once the IP and/or MAC address is determined, the source may send out or forward 504 the packet or packets using the IP or MAC address acquire to the gateway or to the next hop in the path. If the target is outside of the SDN and/or the MAC cannot be determined, the source sends out the packets directly using, for example, the IP address. This process of routing as disclosed herein, which includes a label header for optimized UID routing, may be transparent to the source and destination application. The source and destination applications send/receive their data using the standard TCP/IP model (or other protocol) and are not aware of the actions performed by the programmable switches in the SDN.

In both cases, the packets may be sent to an initial gateway (e.g., an example of a programmable switch). In this example, the initial gateway may be the first programmable switch in the path. In another example and with reference to FIG. 2, the initial gateway in packets transmitted by the pod 234 may be the switch 234 and not the bridge 232. The initial gateway may also be an ingress switch. Thus, the gateway that receives the initial packet may communicate 506 with a controller. For example, the switch may not have any flow entries for a packet and may need to communicate with the controller in order to determine the path and corresponding flow entries. In addition, the controller can determine 508 any policies and configure the path of the packet accordingly. If policies exist, a path may be computed and switches on the path are configured prior to returning a response to the source. The switch configurations may include flow entries or meters or both. If no policy exists, standard protocols and algorithms may be used to configure the network or the path.

The method 500 of configuring the network may include generating and inserting the label header into the packets being transmitted. The label header may include the source UID and destination UID. The method 500 thus configures the network (e.g., the switches) such that traffic (e.g., from a pod) can be recognized and routed appropriately to the target.

Figure 6:
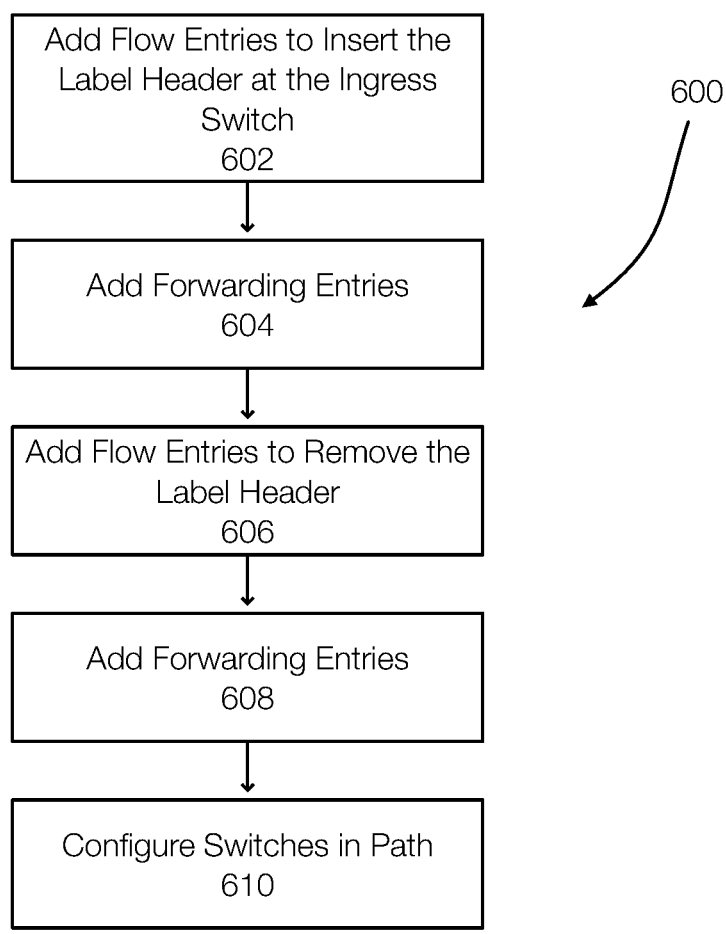
FIG. 6 discloses additional aspects of routing operations in a computing environment.

FIG. 6 discloses additional aspects of configuring the network for policy-driven traffic and/or routing packets. The method 600 may include, at the ingress switch, adding 602 flow entries at the switch. Using the flow entries at the ingress switch, the ingress switch may insert the label header with the corresponding source and destination UIDs into the recognized packets. The ingress switch may also set the ethernet type such that subsequent switches know to look for the label header. In preparing the path, forwarding entries 604 may also be added based on the forwarding process and the computed path to other switches. Meters may also be added if necessary.

At the egress switch, flow entries are added 606. The flow entries at the egress switch cause the egress switch to remove the label header and replace the removed label header with the network provider's mechanism to identify inter-network traffic (e.g., VXLAN or NAT). Forwarding entries may also be added 608 based on the computed path. Meters may be added if necessary.

The other switches in the path may be configured 610 and include the proper flow entries such that the recognized packets are transmitted along the path that has been configured. The controller may also connect with telemetry and monitoring systems and reconfigure the network if requested.

Embodiments of the invention include headers that allow packet flows to be uniquely identified and that allow policies to be applied with reduced overhead. Embodiments of the invention reduce overhead, including on edge network devices, in various types of networks including SDNs and in containerized environments such as Kubernetes environments. Overhead is reduced, in one example, using a packet structure that includes a packet structure that can reduce processing requirements and which may be smaller than conventional TCP/IP packets or VXLAN packets. Thus, processing operations, which may include parsing operations, are reduced and an advantage is obtained compared to traditional networking:

The reduced header size for small transmission applications (e.g., DNS queries) can greatly improve the ratio of payload to header bytes, from 32 bytes (example payload)+108 bytes (VXLAN headers) to the minimum Ethernet frame size of 64 bytes. This reduces the packet overhead ratio from 70% in this example to 50%. This overhead could be further reduced by eliminating the 64-byte minimum frame size, which is possible in a fully programmable network.

Reducing the average packet size across all packets due to reduced header sizes has a direct and linear impact on both the packet processing rate of a programmable network switch (as all switches are required to parse all header bits up to the programmed action), and also improves the reliability of the network. For example, errors are often related to a bit error rate and reduced packet sizes experience fewer errors.

Simplifying the header structure also provides an improvement to the overall usability and ease of programmability of SDN network infrastructure, as flow match actions can be defined with fewer lines of code, and may not require typical network actions (e.g., decrement IPV4 TTL and recalculate checksum) while transiting the network. Using SDN and programmable switches to provide a comprehensive policy and telemetry solution that is not just limited to IP:port tuples but can incorporate user-defined labels and annotations while maintaining a line rate delivery on data plane is disclosed.

An extra feature provided by programmable SDN infrastructure is the ability to provide in-band network telemetry (INT). INT can provide many important network telemetry metrics such as throughput, latency, packet size and many more variables on a per-flow basis. This feature can pair seamlessly with the UID functionality as disclosed herein. By combining the UID with the telemetry gathered from INT, a new level of visibility, granularity, and control of network traffic can be achieved.

This increased level of network control can have direct and tangible benefits to both infrastructure providers and end-users, who will likely have network Quality of Service (Qos) agreements and policies. The increased level of network control and visibility on a per-flow, per-service, and per-customer basis enables the definition and automation of very robust Qos policies, which can autonomously be monitored at a greater depth and can enable more advanced network control actions than previously possible.

An example of such an action is the autonomous movement of workloads (e.g., Kubernetes workloads) across the network to reduce the latency for an application by moving the application closer to the data source at the edge. This is now due to the SDN controller and overall system, which is capable of monitoring: a workload's in-band network telemetry UID header values; and path/hops through the network egress point to third party network. These variables cannot be acquired in standard systems.

Another aspect of embodiments of the invention is the method of collecting and processing application packets as they exit the networking subsystem and transit the physical network infrastructure. In one example, a software switch (e.g., a P4 switch) located within the host device, logically located between the networking subsystem and the host device's physical Ethernet stack may be used to collect and process application packets. In another example, a programmable smart Network Interface Card (smartNIC) may directly interface between the networking subsystem and the physical network hardware. More specifically, the SmartNIC can interface directly between the container application networking subsystem and the physical network infrastructure.

Both of these examples perform the same task of processing packet headers as they egress from the network environment. Overhead is reduced, for example, because the VXLAN encapsulation is removed and the label header, which includes the UIDs, is attached.

Embodiments of the invention maintain compatibility with traditional TCP/IP networks because the SDN controller is aware of the network egress points and service flow paths. This allows a UID-header packet to be re-assembled with the traditional TCP/IP header format if the packet egresses from the network. It is also possible to use embodiments of the invention across edge networks (e.g., SDN clusters) separated by third-party infrastructure. A network packet with a given UID can transit from one edge cluster to another cluster over a third-party network and be re-assembled with the label header on the other side. The SDN controller is aware of all TCP/IP information between the devices the SDN controller controls and the UID can be recalled from the TCP/IP information on the packet acquired during ingestion after transiting the third-party network.

Figure 7:
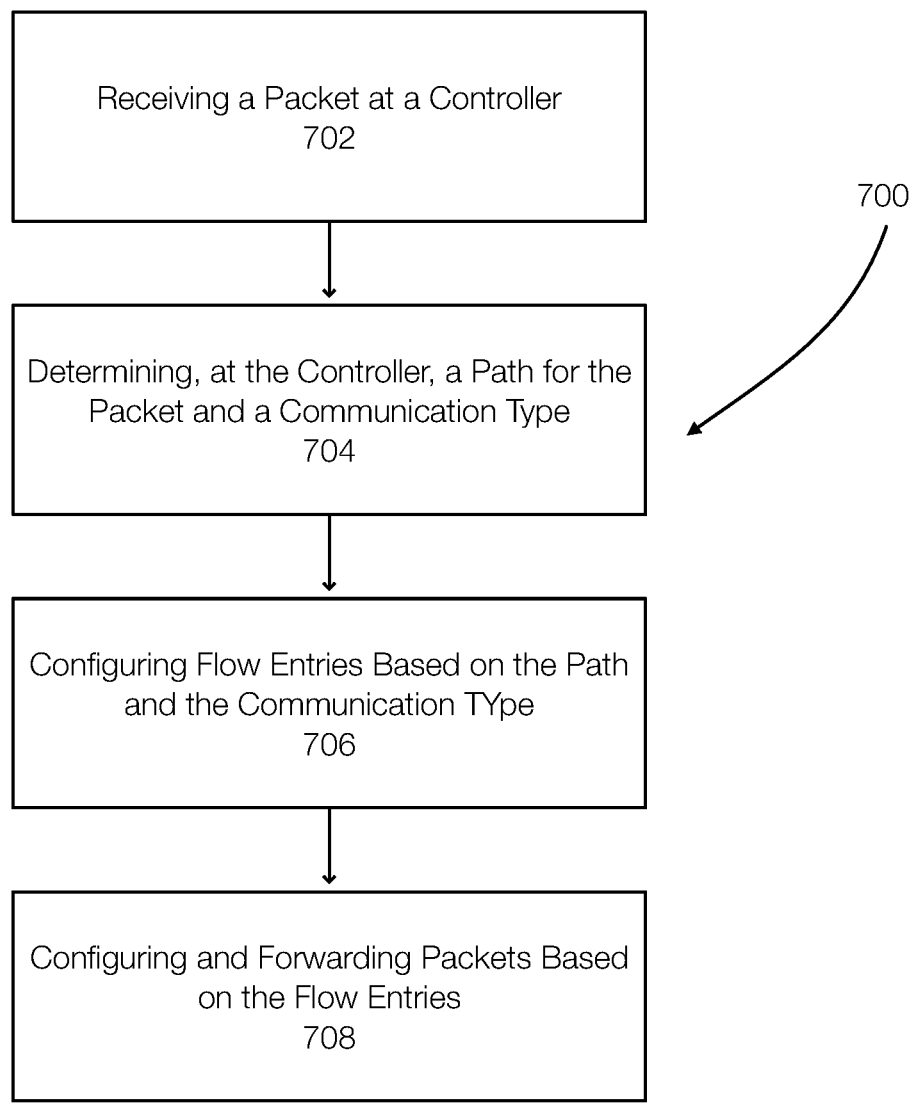
FIG. 7 discloses aspects of configuring a network and of routing packets in the network.

FIG. 7 discloses aspects of routing packets in a network such as an SDN. In the method 700, a packet may be received at a controller from a switch. The packet may have been received at the switch from a pod and sending the packet to the controller is part of ingesting the packet such that the packet and other packets in the flow can be routed. The pod may have generated the packet after determining the address (IP address or MAC address of the target)

The packet is used by the controller to determine 704 a path for the packet to the target and to determine a communication type. Example communication types include intranode communications, intracluster communications, and external communications.

Once the path is determined and the communication type determined, flow entries are configured 706 based on the path and the communication type. The network is then configured 708. This may include setting flow entries at each hop in the path determined by the controller. The flow entries at ingress and egress points may differ from flow entries at other points. For example, an ethernet type may be changed and label header may be added an ingress points. The ethernet type is also changed back and the label header is at egress points. Further traditional header information removed at ingress points may be re-inserted at egress points.

The following examples illustrate different types of communications and policy-based routing operations and refer to FIG. 2. The following examples illustrate communication types between pods on the same node (intranode), pods on different nodes (intracluster), pods on different clusters (external), and pods with an external network (external).

In one example, the pod 202 wants to communicate with the pod 204 using port 80. The pod 202 performs a DNS query and determines the IP address, followed by the MAC address of the pod 204 using ARP and starts sending IP packets. In one example, both types of traffic were preconfigured to be allows for the pod 202 by the SDN controller. The virtual switch 206 forwards an initial packet to the controller 244 because the virtual switch 206 does not know how to process the packets at this stage (unless the path was previously configured). The controller 244 receives the packet and determines that a policy is applicable. The policy, for example, may require tracking traffic on port 80. The controller 244 may also determine that the pod 202 and the pod 204 are connected to the same switch 206.

Because the pods 202 and 204 are connected to the same switch 206, the flow entries of the switch 206 do not include adding label headers. Rather, only forwarding flow entries are added. In this communication type (intranode), the flow entries include: Forward packets coming from pod 202

(10.0.1.1) port 80 and destined for pod 204 (10.0.1.2) to port 2 (assuming that pod 204 is connected with port 2). In one example, the flow entries may also be set to DROP the packets in case a policy restricts communication between the two pods. Periodic or on-demand reporting can be set up for the flow entries based on telemetry requirements. Once the network is configured, subsequent packets transmitted by the pod 202 and recognizes as being from the pod 202 port 80 to the pod 204 are recognized by the switch and are forwarded to the pod 204 without intervention by the controller 244 because the switch 206 will find a match in the flow entries for this type of traffic.

The next example relates to communications between pods on different nodes (intracluster). In this example, the pod 202 wants to communicate with the pod 216. The pod 202 performs a query operation and determines the MAC address of the pod 216 using ARP and starts sending IP packets. In this example both IP/MAC addresses are in the same network. If an IP Address Management (IPAM) module in-use configures these addresses to be separate networks, the traffic will still be sent to the default gateway which in this example is the switch 206. The switch 206 forwards the new traffic to the controller 244 in either case.

In this example, the controller 244 receives the packet and determines that there is a policy to restrict bandwidth to a certain value for all IP traffic between the pods 202 and 216. The controller 244 also computes the forwarding path to include the switch 206, the switch 208, and the switch 218.

These switches are configured with the following flow entries. At the switch 206 (the ingress switch), the flow entries include modifying the label header of the ethernet frames from type 0x0800 to 0x0808 to specify it is no longer an IPV4 routed packet, and is now a UID routed packet coming from the pod 202 (identified by its MAC address and/or other parameters (IP, TCP/UDP port, VXLAN ID, etc.)) and destined for the pod 216. A new label header is then inserted which includes UIDs of the two pods 202 and 216 based on traffic type IP and/or the IP addresses of the pods (e.g., from the database 312) or based on a set of unique values decided upon by the controller. The IP address, TCP/UDP Information, and VXLAN encapsulation can be removed and saved by the controller to reduce overall packet size. This traffic is forwarded to the port connected to the switch 208.

At the switch 208, ethernet frames of type 0x0808 (packets with label headers) with the corresponding UIDs are forwarded to the port connected to the switch 218.

At the switch 218, the label header for packets of ethernet type 0x0808 and corresponding UIDs are removed. The ethernet type is set to 0x0800 (IPv4) and any TCP/IP or VXLAN header information removed from the packet during transit is re-inserted. The traffic is then forwarded to the pod 216. If necessary, a meter for the corresponding entries on these switches 206, 208, and 218 is added with the bandwidth set by the policy.

The next example illustrates communications between pods on different clusters (external). In this example, the pod 202 wants to communicate with the pod 226. The pod 202 determines the MAC address of the pod 226 using ARP and starts sending the IP packets. The controller 244 may receive the initial packet and may find a policy indicating that the pod 226 will only communicate with pods from the cluster 240 if their role is set to "admin". These details may be set using labels and annotations and the information will be available to the controller 244 using the database 312.

A UID will be created for communications from cluster 240 with an "admin" role. Another UID will be created for the pod 226. In this example, the path chosen or set by the controller 244 includes switches 206, switch 210, switch 230 and switch (or SmartNIC) 228.

The following entries are configured. At the switch 206, a label header is added to frames of type 0x0800 coming from the pod 202 and destined for the pod 226. In this example, the pod 202 generates standard traffic (e.g., IPv4), which includes an ethernet type (e.g., 0x0800). The ethernet type is changed to 0x0808 at the switch 206. Source and destination UIDs are set in the label header and the ethernet type is set to 0x0808. This traffic is then forwarded to the port connected to the switch 210. The policy is also enforced.

In this example, the switch 210 is an egress switch as the packets will be transmitted over an external network 260. Thus, at the switch 210, the label header for frames of Ethernet type 0x0808 with the corresponding UIDs are removed and the Ethernet type is set to 0x0800 to make the packet a standard packet (e.g., IPv4 packet). The source and destination IP addresses and UDP port numbers (assuming that NAT is used) are set and the traffic is sent to the switch 230 over the external network 260. IN one example, the sites may be connected using a virtual private network (VPN) such that ARP functions properly. However, a similar result would be achieved using DNS and IPV4 routing rather than ARP and MAC routing.

At the switch 230, which becomes an ingress switch, the ethernet frame type is changed and a label header is added. Thus, for ethernet frames of type 0x0800 coming from the pod 202 (identified by the source IP:port tuple) and destined for the pod 226 (identified by the destination IP:port tuple), the ethernet frame type is changed and the label header is added. More specifically, at the switch 230, source and destination UIDs are set and the ethernet type is changed to 0x0808. This traffic is then forwarded to the port connected to the switch 228.

At the switch 228, the label header for frames of Ethernet type 0x0808 with the corresponding UIDs is removed and the ethernet type is set to 0x0800. Traffic of this type is forwarded to the port connected to the pod 226. Thus, packets transmitted by the pod 202 will be delivered to the pod 226 on a line rate. To explicitly drop any non-admin role packets, the flow entries can be configured to drop any other IP traffic originating from the cluster 240 and destined for the pod 226 using the policy.

These examples illustrate how the network and flow entries are configures and prepared. Once the switches in the path are configured, packets may flow.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, packet operations, routing operations, packet amendment operations, header operations, network configuration operations, forwarding operations, or the like or combinations thereof. More generally, the scope of the invention embraces any operating environment in which the disclosed concepts may be useful.

New and/or modified data collected and/or generated in connection with some embodiments, may be stored in a computing environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations, services, or the like initiated by one or more clients or other elements of the operating environment.

Example cloud computing environments, which may or may not be public, include storage environments that may provide data protection functionality for one or more clients, which may include pods. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage components such as databases, storage servers, storage volumes (LUNs), storage disks, for example, may likewise take the form of software, physical machines, containers, or virtual machines (VM), though no particular component implementation is required for any embodiment.

Example embodiments of the invention are applicable to any system capable of storing and handling various types of objects or data, in analog, digital, or other form.

It is noted that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a packet, at a controller, wherein the packet is generated at a pod and is destined for a target, and wherein the pod is included in a software defined network, a type of communication for the packet and a path for the packet to the target, configuring flow entries for the packet based on the type of communication for each switch in the path controlled by the controller, and configuring packets received at a gateway switch according to the flow entries and forwarding the packets according to the flow entries associated with the gateway.

Embodiment 2. The method of embodiment 1, further comprising receiving the packet at the gateway switch, wherein the gateway is configured to forward the packet to the controller when no flow entries are present at the gateway and wherein the gateway is an ingress switch.

Embodiment 3. The method of embodiment 1 and/or 2, wherein the gateway switch comprises a programmable switch, a virtual programmable switch, or a SmartNIC.

Embodiment 4. The method of embodiment 1, 2, and/or 3, where the type of communication is intranode when the controller determines that the pod and the target are on a same node, further comprising: applying any existing policies setting forwarding entries at the gateway switch that include forwarding packets coming from the pod to the target without changing the packets.

Embodiment 5. The method of embodiment 1, 2, 3, and/or 4, further comprising dropping the packets when a policy restricts communications between the pod and the target.

Embodiment 6. The method of embodiment 1, 2, 3, 4, and/or 5, wherein the type of communication is intracluster when the controller determines that the pod and the target are on different nodes in a same cluster, further comprising: applying any existing policies, and setting forwarding entries at the gateway that include: adding a label header to packets at the gateway switch coming from the pod and destined for the target, wherein the pod and the target are identified by their MAC addresses, wherein the label header includes a first identifier for the pod and a second identifier for the target, changing an ethernet type to the packets at the gateway, and forwarding the packets to a next switch in the path.

Embodiment 7. The method of embodiment 1, 2, 3, 4, 5, and/or 6, further comprising setting forwarding entries at the next switch that include forwarding packets of the ethernet type and having the first and second identifiers to a next hop in the path.

Embodiment 8. The method of embodiment 1, 2, 3, 4, 5, 6, and/or 7, wherein the next switch is an egress switch, further comprising setting forwarding entries that include removing the label header for packets of the ethernet frame type and including the first and second identifiers, changing the ethernet frame type and forwarding the packets to the target.

Embodiment 9. The method of embodiment 1, 2, 3, 4, 5, 6, 7, and/or 8, further comprising adding a meter for the forwarding entries.

Embodiment 10. The method of embodiment 1, 2, 3, 4, 5, 6, 7, 8, and/or 9, wherein the path includes an external network and the type of communication is external, further comprising setting forwarding entries by: at the gateway switch: adding a label header to packets coming from the pod and destined for the target, wherein the label includes a first identifier of the pod and a second identifier of the target, and changing an ethernet type, and forwarding the packets according to the path; at an egress switch: removing the label header and changing the ethernet type, setting IP addresses for the pod and the target, at a second ingress switch: adding a new label header, changing the ethernet type, and forwarding the packets to a final switch, and at the final switch: removing the label header and changing the ethernet type.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, agent, engine, component, service, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
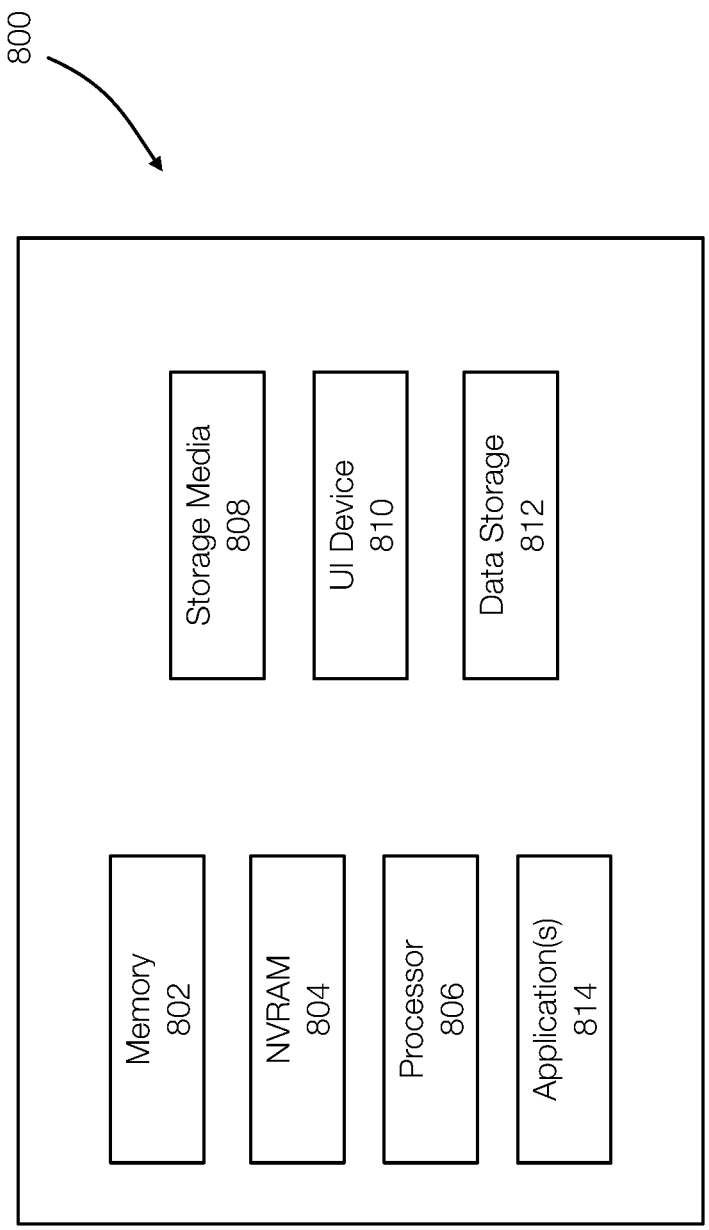
FIG. 8 discloses aspects of a computing device, system, or entity.

With reference briefly now to FIG. 8, any one or more of the entities disclosed, or implied, by the Figures, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The device 800 may also represent a computing system, such as an edge environment, a cloud-based environment or the like and may be representative of multiple devices, such as nodes in one or more clusters.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving packets, at a controller, wherein the packets are generated at a first pod and is destined for a target pod, and wherein the pod is included in a software defined network;
    determining, by the controller, a type of communication for the packets and a path for the packets to the target pod;
    configuring flow entries, by the controller, for the packets based on the type of communication for each switch in the path controlled by the controller; and
    configuring the packets at a gateway switch, by the gateway switch according to the flow entries, and forwarding the packets according to the flow entries associated with the gateway switch,
    wherein, when the type of communication is intracluster:
        applying any existing policies; and
        setting forwarding entries at the gateway switch that include:
            adding a label header to packets at the gateway switch coming from the first pod and destined for the target pod, wherein the first pod and the target pod are identified by their MAC addresses, wherein the label header includes a first identifier for the first pod and a second identifier for the target pod;
            changing an ethernet type to the packets at the gateway switch; and
            forwarding the packets to a next switch in the path.

2. The method of claim 1, further comprising:
    receiving the packets at the gateway switch, wherein the gateway switch is configured to forward the packets to the controller when no flow entries are present at the gateway switch and wherein the gateway switch is an ingress switch.

3. The method of claim 2, wherein the gateway switch comprises: a programmable switch, a virtual programmable switch, or a SmartNIC (Smart Network Interface Card).

4. The method of claim 1, where the type of communication is intranode when the controller determines that the first pod and the target pod are on a same node, further comprising, when the type of communication is intranode:
    applying any existing policies;
    setting the forwarding entries at the gateway switch that include forwarding the packets coming from the first pod to the target pod without changing the packets.

5. The method of claim 4, further comprising:
    dropping the packets when a policy restricts communications between the first pod and the target pod.

6. The method of claim 1, wherein the type of communication is intracluster when the controller determines that the first pod and the target pod are on different nodes in a same cluster.

7. The method of claim 6, further comprising: setting the forwarding entries at the next switch that include forwarding the packets of the ethernet type and having the first and second identifiers to a next hop in the path.

8. The method of claim 6, wherein the next switch is an egress switch, further comprising: setting the forwarding entries that include removing the label header for the packets of the ethernet frame type and including the first and second identifiers, changing the ethernet frame type and forwarding the packets to the target pod.

9. The method of claim 8, further comprising: adding a meter for the forwarding entries.

10. The method of claim 1, wherein when the path includes an external network and the type of communication is external, further comprising: setting the forwarding entries by:
    at the gateway switch:
        adding a label header to the packets coming from the first pod and destined for the target pod, wherein the label includes the first identifier of the pod and the second identifier of the target pod, and changing an ethernet type in the packets; and
        forwarding the packets according to the path;
    at an egress switch:
        removing the label header and changing the ethernet type;
        setting IP addresses for the first pod and the target pod;
    at a second ingress switch:
        adding a new label header, changing the ethernet type, and forwarding the packets to a final switch; and
    at the final switch:
        removing the label header and changing the ethernet type.

11. The method of claim 1, further comprising: removing unnecessary header information while the packets are in transit in the software defined network, wherein the unnecessary header information is re-inserted at an egress switch.

12. A non-transitory storage medium storing therein instructions that are executable by one or more hardware processors to perform operations comprising:
    receiving packets, at a controller, wherein the packets are generated at a first pod and is destined for a target pod, and wherein the first pod is included in a software defined network;
    determining, by the controller, a type of communication for the packets and a path for the packets to the target pod;
    configuring flow entries, by the controller, for the packets based on the type of communication for each switch in the path controlled by the controller; and
    configuring the packets at a gateway switch, by the gateway switch according to the flow entries, and forwarding the packets according to the flow entries associated with the gateway switch,
    wherein, when the type of communication is intracluster:
        applying any existing policies; and
        setting forwarding entries at the gateway switch that include:
            adding a label header to the packets at the gateway switch coming from the first pod and destined for the target pod, wherein the first pod and the target pod are identified by their MAC addresses, wherein the label header includes a first identifier for the first pod and a second identifier for the target pod;
            changing an ethernet type to the packets at the gateway switch; and
            forwarding the packets to a next switch in the path.

13. The non-transitory storage medium of claim 12, further comprising receiving the packets at the gateway switch, wherein the gateway switch is configured to forward the packets to the controller when no flow entries are present at the gateway switch and wherein the gateway switch is an ingress switch.

14. The non-transitory storage medium of claim 13, wherein the gateway switch comprises: a programmable switch, a virtual programmable switch, or a SmartNIC (Smart Network Interface Card).

15. The non-transitory storage medium of claim 12, where the type of communication is intranode when the controller determines that the first pod and the target pod are on a same node, further comprising when the type of communication is intranode:
- applying any existing policies;
- setting forwarding entries at the gateway switch that include forwarding the packets coming from the first pod to the target pod without changing the packets.

16. The non-transitory storage medium of claim 15, further comprising: dropping the packets when a policy restricts communications between the first pod and the target pod.

17. The non-transitory storage medium of claim 12, wherein the type of communication is intracluster when the controller determines that the first pod and the target pod are on different nodes in a same cluster.

18. The non-transitory storage medium of claim 17, further comprising: setting forwarding entries at the next switch that include forwarding the packets of the ethernet type and having the first and second identifiers to a next hop in the path.

19. The non-transitory storage medium of claim 17, wherein the next switch is an egress switch, further comprising: setting forwarding entries that include removing the label header for the packets of the ethernet frame type and including the first and second identifiers, changing the ethernet frame type, reinserting headers removed at an ingress switch and forwarding the packets to the target pod.

20. The non-transitory storage medium of claim 12, wherein when the path includes an external network and the type of communication is external, further comprising setting forwarding entries by:
- at the gateway switch:
  - adding a label header to the packets coming from the first pod and destined for the target pod, wherein the label includes the first identifier of the first pod and the second identifier of the target pod, and adding an ethernet type; and
  - forwarding the packets according to the path;
- at an egress switch:
  - removing the label header and changing the ethernet type;
  - setting IP addresses for the first pod and the target pod;
- at a second ingress switch:
  - adding a new label header, changing the ethernet type, and forwarding the packets to a final switch; and
- at the final switch:
  - removing the label header and changing the ethernet type.

* * * * *